UNITED STATES PATENT OFFICE.

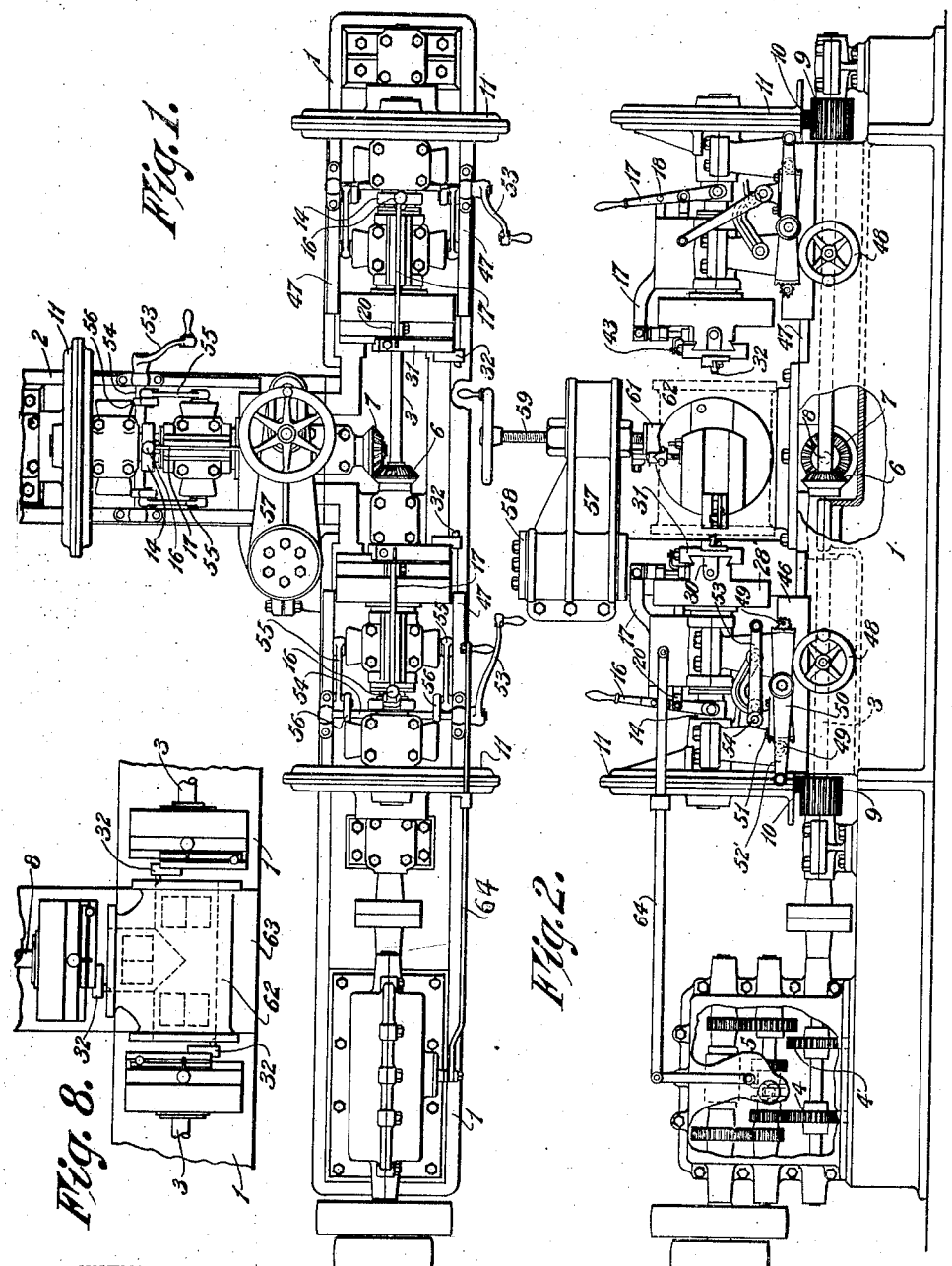

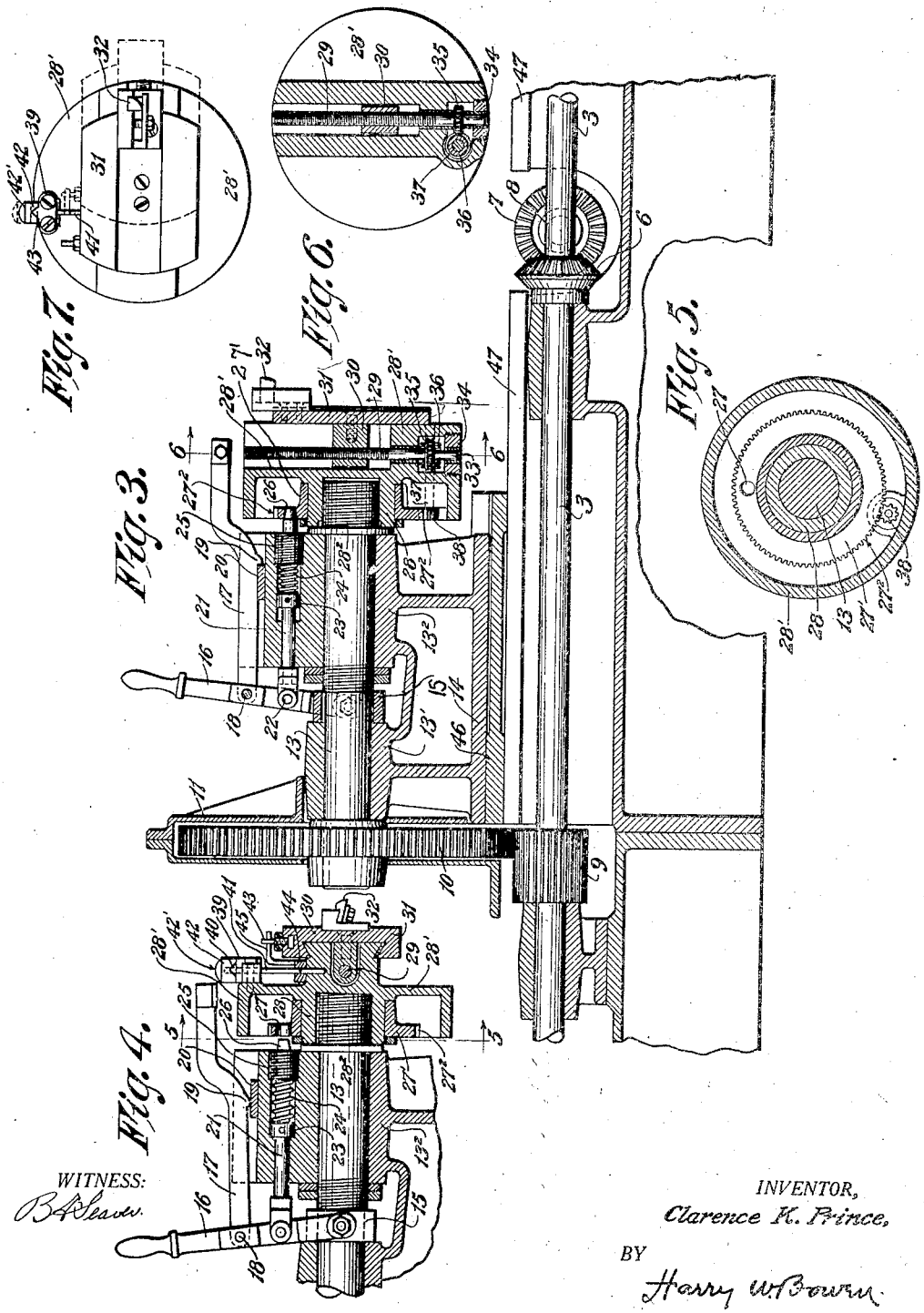

CLARENCE K. PRINCE, OF WESTFIELD, MASSACHUSETTS.

PIPE-FLANGE-TURNING MACHINE.

1,349,434.  Specification of Letters Patent.  Patented Aug. 10, 1920.

Application filed May 7, 1919. Serial No. 295,412.

*To all whom it may concern:*

Be it known that I, CLARENCE K. PRINCE, a citizen of the United States of America, residing at Westfield, in the county of Hampden and Commonwealth of Massachusetts, have invented certain new and useful Improvements in Pipe-Flange-Turning Machines, of which the following is a specification.

This invention relates to improvements in machines for finishing or turning the flanges of pipe couplings, that is to say, couplings in which the two parallel arranged end flanges are to be finished, or, in which there are three, as in the ordinary T-coupling.

This invention, broadly considered, comprises a bed or base-plate having a longitudinal driven shaft located therein and an L-shaped or angular formed portion comprising a part of the bed-plate and having a shaft located therein that is suitably geared or connected to the first mentioned shaft; suitable mechanism for changing the speed of the shaft, face-plate devices for holding the metal cutting tool for turning the outer ends of the flange of the coupling, means for autmotically disengaging the cutting tool from the work at the termination of the cut, and means for automatically stopping the operation of the machine at the end of the finish or cut.

Referring to the drawings:—

Figure 1 is a plan view of the complete machine showing the handle for moving the cutting tools toward and away from the flanges of the coupling to be finished, the casing inclosing the change speed gears and clearly illustrating the open part of the machine where the pipe coupling is inserted for the turning off or truing the flanges.

Fig. 2 is a side elevational view of Fig. 1 with a portion of the machine in section showing the change speed gears, the longitudinally extending shaft in the base member, the face plates, and the handle operating devices for moving the carriages that carry the face-plates.

Fig. 3 is an enlarged detail sectional view of one of the cutting tool holding and operating devices and the carriage for moving the same, also the trip mechanism for stopping the operation of the cutting tool at the termination of the cut, a portion of the longitudinally arranged shaft showing the position of the parts before the operation of the cutting tool is stopped.

Fig. 4 is a view similar to Fig. 3, but showing the position of the parts after the cutting tool has been stopped by the tripping or disengaging mechanism.

Fig. 5 is a detail sectional view on the line 5—5 of Fig. 4 showing the gear construction for opearting the cutting tool.

Fig. 6 is a sectional view on the line 6—6 of Fig. 3 showing, in detail, the means for moving the cutting tool, and, illustrating in particular the worm-gear connection between the threaded rod which moves the cutting tool and the shaft which is operated by the gear or ring.

Fig. 7 is a face view of the cutting tool carrying devices and illustrating the stop which actuates the clutch operating mechanism, and Fig. 8 shows a T-coupling in outline being finished.

Referring to the drawings in detail: The bed or base portion of the machine is indicated by the numerals 1 and 2, the numeral 1 indicating the longitudinal or main part of the machine and the numeral 2 the off-set or T-portion. 3 indicates the longitudinally arranged driving shaft which is located in the base 1 and which is driven by means of either one of the spur gears 4 or 4' through the change speed gear construction indicated as a whole by the numeral 5, which is designed for causing the shaft 3 to rotate at different speeds and in opposite directions. The shaft 3 carries the bevel gear 6 which meshes with the bevel gear 7 that is secured to the transversely located shaft 8 which extends at right angles to the shaft 3 and is located in the bed or base-piece 2. Secured to the shaft 3 are two spur gears 9 that, as shown, are of considerable length, the purpose of which is to maintain the large spur gears 10 always in mesh therewith during the reciprocation of the carriage which carries the cutting tools. It is to be understood that the shaft 8 carries a gear like the gears 9. 11 indicates the casing within which is located the large spur gear 10. The gear 10 is rigidly secured to the shaft 13 which is mounted in bearings 13' and 13² of the carriage 14. Loosely mounted on the shaft 13 is a collar or ring 15 to which the lever 16 is pivotally connected. Pivotally connected to this lever is a latch bar 17, at the point 18, which is formed with a shoulder 19 on its lower edge thereof and which engages the fixed stop or part 20 on the carriage 14. Also, pivotally connected to the lever 16 is the rod 21 at the point 22. This rod 20 carries a ring 23 fixed thereto against which bears the coiled compression spring 24 at one of its ends and against a plug 25 at its other end. The rod 20 passes loosely through the plug 25 and is formed at its outer end with a tapered end portion 26. This tapered portion is designed to enter the opening 27 of a ring 27' having teeth $27^2$ on its outer edge. This ring is loosely mounted on the hub 28 of a face plate 28' which is permanently secured to the shaft 13 by means of the threads $28^2$ and has mounted therein the transversely located lead or feed screw 29 which operates a block 30 which, in turn, carries a slide 31 on which the cutting tool 32 is mounted. The lower end of the screw 29 has a bearing 33 in the plug 34 of the plate 28' and secured to this screw is a worm gear 35 with which meshes the worm gear 36 that is mounted on the shaft 37 (see Figs. 3 and 6). This shaft, as shown in Fig. 6, extends at right angles to the screw 29 and is driven by means of the pinion gear 38 engaging the teeth $27^2$ of the ring 27' when this is held against movement by the rod 21 entering the opening 27, as shown in Fig. 3, whereby when the face plate 28' is rotated by the shaft 13, the gear 38 will drive the shaft 37, which carries the worm gear 36 and which in turn will drive the worm gear 35 that is secured to the screw 29 that operates the block 30, slide 31 and cutting tool 32.

Carried by the face-plate member 28' is a projection 39 having an angular shaped portion 40 at its upper end; 41 is a rod rotatably mounted in the projection 39 and has a block 42 secured to its upper end and with a rounded upper surface 42' and a V-shaped lower face to engage the angular shaped portion 40 (see Fig. 4). Secured to the movable piece 31 is a pin 43. Secured to the rotatable rod 41 is a plate 44 and an angular arm 45, the purpose of which is to turn the rod 41 when it is struck by the pin 43 during the outward travel of the piece 31 when the cutter 32 reaches the end of its cut. The operation of this part of my invention is as follows: Assuming the parts to be in the position shown in Fig. 3, the face plate 28' is being rotated by the shaft 13. The cutter 32 is being moved outward radially by the gear 38 engaging and traveling around the teeth $27^2$ of the ring 27', which is now held locked against movement by the rod 21, engaging the opening 27; gear 38 through the shaft 37 and worm gears 35 and 36 operates the screw 29 which moves the block 31 and cutter 32 outward. When the cutter has finished its operation on the flange of the pipe coupling the pin 43 will strike the arm 45, rotating the rod 43, causing the block 42 to ride up the angular face 40 and its rounded outer end to strike the lever 17 moving it upward and disengaging the shoulder portion 19 from the part 20. The spring 24 now automatically moves the end 26 of the rod 21 out of the opening 27 of the plate or ring 27' (see Fig. 4) causing further outward movement of the cutter 32 to cease. The face plate 28' and the gear 38 now travel idly on the teeth $27^2$ of the ring 27'.

Referring now to the devices for operating the carriage 14 longitudinally of the machine, 46 (see Fig. 3) is a plate on which the carriage part 14 slides. The part 46 slides on the ways 47 and is moved thereon by means of the hand wheels 48, carrying a pinion which engages a rack (not shown) on the part 46. Suitable devices are provided for locking the part 46 to the ways 47 by means of the set-screws 49 which are operated by the double armed sector rack 50 whose teeth 51 engage the teeth and operate the set screws 49. (See Fig. 2.) This rack is operated by means of the handle 52'.

For moving the carriage 14 on the adjustable part 46 a hand crank 53 is employed. This crank is connected to the rod 54 that is rotatably mounted on the base pieces 1 and 2. Connected to the rod 54 are links 55 by means of the short arms 56, which are secured to the rod 54 at one of their ends and to the links 55 at their other ends. The links 55 are in turn connected to the carriage 14 whereby when the handle 53 is operated the slides 14 will be moved on the part 46 carrying the cutter 32 and its supporting plate 28' toward the work.

It will be noticed that the links 55, arms 56 and handle 53 form a toggle joint to retain the carriage in position after it has been adjusted. During such movements of the carriage the pinion 10 and gear 9 are always in mesh. For clamping a flanged pipe coupling in the machine for turning off the flanges, the swinging arm 57 is employed which is mounted on the upright 58. This arm carries a screw 59 having a hand wheel 60 for operating the same. A foot-piece 61 engages the upper surface of the coupling 62 as shown in Fig. 2.

In the operation of the machine the flanged coupling 62 is inserted in the machine on V-shaped supports 63 in the space between the cutter carrying plates 28'. The clamping arm 57 is swung around over the coupling and the screw 59 turned down, moving the foot-piece 61 onto the coupling. The hand wheels 48 move the plates 46 and the carriages 14 toward the ends of the flanges. The plates 46 are now clamped to the ways 47 by means of the crank arm or wheel 52'. The operator now, by means of the handle 53, moves the cutters 32 against the work. The gears 5 are now thrown into mesh by means of the shaft lever 64 and the plates 28' and cutters 32 are operated through the mechanisms already described, until the cutters are automatically stopped by means of the tripping mechanism which automatically removes the rod 21 from the opening 27 of the toothed ring 27'.

It is understood that at the termination of the cutting operation the cutter 32 is returned to its initial position by reversing the direction of rotation of the shafts 3 and 8. The lever 16 must first be operated, however, to move the rod 21 into the opening 27.

What I claim is:

1. A machine for finishing the flanges of a pipe-coupling, and comprising, in combination, a base, a shaft therein, a movable carriage, a revolving cutter on the carriage, means for moving or feeding the cutter across the face of a flange being finished and simultaneously rotating the same, means controlled by the cutter for automatically stopping the feeding movement of the cutter at the termination of the cut, said means serving to permit the continued rotation of the feeding means during the return of the cutter to its initial position.

2. In a machine for the purpose described, the combination, of means for clamping a flanged coupling in the machine, means for moving a plurality of cutters toward and away from the faces of the flanges, means for simultaneously operating all of the cutters, means for automatically arresting the outward movements of the cutters at the termination of the cutting operations comprising a plate, a lead screw thereon, a toothed ring, means for locking the ring against movement, operated connections between the ring and the cutter carrying plate, the ring having means for locking the same and interengaging means between the plate and the locking means of the plate for releasing the locking means when the plate reaches a predetermined point.

3. A flange turning machine, having in combination, a base member, a slide thereon, a carriage on the slide, a cutter carried by the slide, a main drive shaft, means for maintaining the operation of the cutter during the adjustment of the slide.

4. A flange turning machine, comprising, in combination, a main drive shaft, a plate carrying a cutter, means for operating the cutter, means for operating the plate including a toothed ring, a gear engaging the ring, and gear connections between the ring and the means for operating the cutter, and means for automatically releasing the ring at the termination of the cutting operation, and means for operating the plate from the drive-shaft.

5. A flange turning machine comprising, in combination, a slide, a shaft supported therein, a plate secured to the shaft and having a cutter mounted thereon and adapted for radial movement across the face of the plate, a toothed ring loosely mounted on the plate, means for operating the cutter from the ring, means for locking the ring, means for automatically unlocking the ring to permit the continued rotation of the plate and the stopping of the operation of the cutter.

6. In a machine of the kind described, the combination, with a T-shaped base-piece, drive shafts located therein, a plurality of slides carrying cutters, means for operating the cutters simultaneously from the drive shafts, means for moving the slides toward and from each other, means for locking the slides, means for operating the cutters from the drive shafts including elongated pinions on the drive shafts, gears on the slides meshing with the pinions during the adjustment, a movable ring, means for holding the ring against movement, said ring having teeth on its periphery and operative connecting means between the teeth and the cutter, whereby when the main shaft is operated, the cutter will be operated, and means for releasing the ring at the termination of the cut.

7. In a flange finishing machine for pipe-couplings, in combination, a drive shaft, a shaft geared thereto, a plate secured to the second shaft and a cutter carrying slide carried by the plate, means for operating the slide from the second mentioned shaft, means for stopping the movement of the cutter comprising a pin carried by the slide, a rotatable rod mounted on the plate and having a cone-shaped end, a cap-piece resting on the cone-shaped end, a tripping mechanism, whereby when the pin on the slide engages the rotatable rod, the cone-shaped piece will be moved into the path of the tripping mechanism, whereby when the tripping mechanism is released the continued operation of the cutter is prevented.

8. In a flange turning machine, in combination with a slide, a shaft therein, means for rotating the shaft, a face-plate secured thereto and carrying a cutter, means for stopping the action of the cutter comprising a ring loosely mounted on the shaft, a lever connected to the ring, a locking bolt connected to the lever, a gear on the plate and formed with an opening to receive the locking bolt, a trip-arm also connected to the lever and having a projection engaging the fixed part of the machine for retaining the locking bolt in engagement with the gear, and means located in the path of the end of the tripping lever for operating the same to disconnect the projection at the termination of the cut, for automatically withdrawing the locking bolt from the ring.

9. In a flange turning machine, a tripping mechanism for stopping the action of the cutter and comprising a plate, a bracket thereon, a rotatable rod supported by the bracket and having a conical shaped end, a plate carried by the rod, an arm secured to the plate, a slide to support the cutter and having a pin thereon adapted to strike the arm to rotate the rod, the conical end of the rod having a saddle member resting on the conical shaped end, whereby when the rod is rotated the saddle member is operated, and connecting means between the saddle member and the shaft for disconnecting the driving mechanism for the cutter.

10. In a flange finishing machine for simultaneously turning the three flanges at one operation, and comprising a base-member of T-shaped formation, driving shafts therein, three carriages adapted to be moved toward and away from the three flanges of the T-shaped coupling, each of the carriages having a cutter, means for operating the cutters across the face of the flange, means for stopping the feeding movements of the cutters at the ends of the cuts and including plates, movable thereon, connections between the gear rings and the cutters, locking bolts for the rings, levers connected to the locking bolts, trip arms connected to the levers, means for locking the same to the carriages, means for elevating the trip arms at the termination of the cuts and comprising projections, means for automatically elevating the projections into the paths of the trip arm at the termination of the cuts, whereby the continued movements of the cutters are arrested, and means for returning the cutters to their initial positions.

11. A machine for finishing the flanges of a T-pipe coupling and comprising, in combination, a base member, operating shafts therein, carriages on the base-member, each carriage having a cutter, means for simultaneously operating the cutters from the shafts, movable rings for transmitting the power from the shafts to the cutters, means for locking the same during the outward travel of the cutters across the face of the flanges, means for automatically releasing the rings at the termination of the travel of the cutters across the flange face of the cutters and including rod, means for holding the rod in engagement with the ring during the cutting operation, a spring on the rod, and means on the cutter-carrying member for disengaging the locking means when the cutters reach the termination of their cutting operation.

12. A pipe flange finishing machine having in combination, a base-piece, means for clamping the pipe flange in the machine, a carriage, means for adjusting the same comprising a shaft, links thereon, a handle having a toggle-joint connection with the shaft on the carriage, a shaft, a cutter carrying plate secured to the shaft, a slide on the plate to which the cutter is attached, means between the shaft and slide for operating the slide to feed the cutter when the shaft is operated, and means for automatically stopping the feed of the cutter when it reaches the end of the cut.

13. A cutter operating mechanism for a flange turning machine, comprising, in combination, a carriage, a shaft, a plate secured thereto, a cutter carrying slide on the plate, a gear ring mounted for rotation on the slide, means for locking the ring, means engaging the ring and connected to the slide for operating the slide, and means for automatically unlocking the ring at the end of the cutting operations.

14. In a pipe flange finishing machine, the combination, of a carriage for supporting the cutter, a shaft to which the cutter is attached, means for stopping the feed of the cutter comprising a lever, a spring actuated rod connected thereto, a gear engaged by the rod, a bar connected to the lever, with means thereon for latching the same to the carriage, and means for unlatching the bar when the cutter reaches the end of its cut.

15. In a pipe flange finishing machine, the combination, of a carriage for supporting the cutter, a shaft to which the cutter is attached, means for stopping the feed of the cutter comprising a lever, a spring actuated rod connected thereto, a gear engaged by the rod, a bar connected to the lever, with means thereon for latching the same to the carriage, and means for unlatching the bar when the cutter reaches the end of its cut, and comprising a rotatable rod, an arm for turning the same, means on the rod adapted to be moved against the bar, when the rod is rotated.

16. In a flange turning machine, the combination, a cutter a slide on which it is mounted, means for operating the slide comprising a shaft, a movable gear ring, a threaded rod for moving the slide, operative connecting means between the rod and the gear ring, means for locking the ring during the time the slide is operated and means for automatically unlocking the ring when the cutter reaches the end of the cut.

17. In a flange turning machine, a shaft, a plate secured thereto, a cutter carrying slide thereon, a ring gear, the plate carrying a gear which engages the ring gear and travels around the same during the cutting operation, connections between the gear and the slide, automatic means for unlocking the gear at the end of the cut.

CLARENCE K. PRINCE.